(12) United States Patent
Werlen et al.

(10) Patent No.: US 11,079,067 B2
(45) Date of Patent: Aug. 3, 2021

(54) HYDROGEN REFUELING SYSTEM

(71) Applicant: L'Air Liquide, Societe Anonyme pour l'Etude et l'Exploitation des Procedes Georges Claude, Paris (FR)

(72) Inventors: Etienne Werlen, Tokyo (JP); Thierry Ott, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/466,162

(22) PCT Filed: Dec. 6, 2016

(86) PCT No.: PCT/JP2016/005074
§ 371 (c)(1),
(2) Date: Jun. 3, 2019

(87) PCT Pub. No.: WO2018/104893
PCT Pub. Date: Jun. 14, 2018

(65) Prior Publication Data
US 2020/0072417 A1 Mar. 5, 2020

(51) Int. Cl.
*F17C 5/00* (2006.01)
*F17C 13/02* (2006.01)

(52) U.S. Cl.
CPC ............ *F17C 5/007* (2013.01); *F17C 13/025* (2013.01); *F17C 2221/012* (2013.01);
(Continued)

(58) Field of Classification Search
CPC .. F17C 5/007; F17C 13/025; F17C 2221/012; F17C 2250/032; F17C 2250/043;
(Continued)

(56) References Cited

U.S. PATENT DOCUMENTS

2004/0163731 A1* 8/2004 Eichelberger ............. B60S 5/02
141/284
2005/0284154 A1* 12/2005 Peter ..................... F17C 13/021
62/45.1
(Continued)

FOREIGN PATENT DOCUMENTS

DE   102007011742 A1 *  9/2008  ................ F17C 5/06
WO   WO 2016/067780       5/2016

OTHER PUBLICATIONS

DE102007011742A1—Translated (Year: 2007).*
International Search Report and Written Report for PCT/JP2016/005074, dated Aug. 2, 2017.

*Primary Examiner* — Timothy P. Kelly
*Assistant Examiner* — Christopher M Affil
(74) *Attorney, Agent, or Firm* — Christopher J. Cronin

(57) ABSTRACT

The present invention is to provide a hydrogen refueling system capable to cool down the H2 pre-cooling heat exchanger fast enough when a FCV enters the HRS, so that there is no or very minimal waiting time for the customer before starting refueling. A hydrogen refueling system including a cryogenic fluid tank that stores a cryogenic fluid, a dispenser that supplies H2 to a vehicle, including a heat exchanger that cools H2 with the cold and/or cryogenic fluid provided from the cryogenic fluid tank, an inlet line that sends the cold and/or cryogenic fluid to the heat exchanger from the cryogenic fluid tank, an outlet line that collects the cryogenic fluid fed from the heat exchanger, and an injection valve that is provided in the inlet line.

4 Claims, 3 Drawing Sheets

(52) U.S. Cl.
CPC .. *F17C 2250/032* (2013.01); *F17C 2250/043* (2013.01); *F17C 2250/0439* (2013.01); *F17C 2265/065* (2013.01); *F17C 2270/0139* (2013.01); *F17C 2270/0184* (2013.01)

(58) Field of Classification Search
CPC ........ F17C 2250/0439; F17C 2265/065; F17C 2270/0139; F17C 2270/0184; C01B 2203/1614; C01B 2203/1619; C01B 2203/1623; C10L 2270/00; C10L 2270/06; C10L 1/02; H01M 8/00; H01M 8/04; H01M 8/04007; H01M 8/04067; H01M 8/04074; F28D 2021/0043
USPC .......................................... 141/82
See application file for complete search history.

(56) References Cited

U.S. PATENT DOCUMENTS

| | | |
|---|---|---|
| 2007/0113921 A1 | 5/2007 | Capizzo |
| 2009/0229701 A1 | 9/2009 | Allidieres et al. |
| 2013/0125568 A1* | 5/2013 | Chalk ................. F04D 29/5833 62/115 |
| 2014/0102587 A1* | 4/2014 | Nagura ................. B60L 58/40 141/69 |
| 2016/0146400 A1* | 5/2016 | Allidieres ................. F17C 5/06 141/4 |
| 2016/0153615 A1 | 6/2016 | Allidieres |

* cited by examiner

US 11,079,067 B2

HYDROGEN REFUELING SYSTEM

CROSS-REFERENCE TO RELATED APPLICATIONS

This application is a § 371 of International PCT Application PCT/JP2016/005074, filed Dec. 6, 2016.

BACKGROUND ART

Field of the Invention

The present invention relates to a hydrogen refueling system, for example a hydrogen refueling station (HRS).

Related Art

According to current standards of refueling protocols, to achieve fast refueling of Fuel Cell Vehicles (FCV) tanks with 70 MPa nominal hydrogen refueling pressure, the hydrogen needs to be pre-cooled below −33° C., at dispenser outlet, in order to avoid overheating in FCV tank by adiabatic compression.

Today, this is done by having one heat exchanger, typically compact diffusion bonded heat exchanger, installed in the dispenser 520, and fed with a heat carrying fluid, typically brine (see FIG. 3, prior art). The heat carrying fluid is circulated between the traditional chiller 510 using refrigerant and the dispenser 520 by means of a pump.

In order to keep the HRS ready-to-fill coming vehicles, the heat exchanger is kept permanently at around −40° C. Due to frigorific losses on the system (heat carrying fluid loop, heat exchanger, chiller 510), the consumption of electricity is high, especially during summer. Considering that the FCV load of one HRS is typically very irregular, this is highly inefficient during periods of time when no FCV is coming. However, it is not possible to stop the chiller and let the system come back to ambient temperature, because cooling time of the complete system cannot be accepted as waiting time for a customer coming.

SUMMARY OF THE INVENTION

Previously, nominal $H_2$ refueling pressure in FCV was limited to 35 MPa. In this situation, there is little overheating of FCV tank caused by adiabatic compression at the time of refueling, and $H_2$ pre-cooling is not necessary. In order to increase FCV autonomy, nominal $H_2$ refueling pressure has been increased to 70 MPa. In the new situation, and to achieve fast FCV refueling according to current standards of refueling protocols, $H_2$ pre-cooling is needed upstream FCV tank because otherwise, the overheating of FCV tank would exceed the capability of the composite materials currently used to make FCV tanks (such as polyethylene). In pre-cooling, for the lowest dispenser fuel delivery temperature category (corresponding to fastest refueling), it is needed to cool $H_2$ so that the temperature at the outlet of the dispenser is between −33° C. and −40° C.

The target of 70 MPa FCV refueling is to reach nominal $H_2$ density in FCV tank corresponding to 70 MPa at 15° C. (i.e. 40.2 g/l), within about 3 minutes for 5 kg $H_2$ fueling quantity. Without pre-cooling, the nominal filling of FCV tank could not be achieved fast enough.

In the prior art system of FIG. 3, because all the elements within the dotted line must be at a low temperature, the time needed to cool down the system upon start-up is long. Also, due to frigorific losses of the system, even though no cold is needed for $H_2$ refueling, permanent power consumption is observed during opening times of HRS. It causes high electricity costs even if during long periods of time, no FCV refueling is performed.

This is not efficient and savings could be achieved if it was possible to stop the chiller during idle time of the HRS. In the current situation, this is not possible because the time needed to cool down all the elements within the dotted line of FIG. 3 could not be accepted as waiting time for the customer. As a matter of fact, cooling down the metal mass of the $H_2$ pre-cooling heat exchanger is a necessary preliminary condition to start refueling.

Also, other prior art described WO 2016/067780 is known, but cannot solve the above problems.

Objects of the present invention are to provide a hydrogen refueling system capable to cool down the $H_2$ pre-cooling heat exchanger fast enough when a FCV enters the HRS, so that there is no or very minimal waiting time for the customer before starting refueling.

As first invention, a hydrogen refueling system including:
a cryogenic fluid tank that stores a cryogenic fluid;
a dispenser that supplies $H_2$ to a vehicle, including a heat exchanger that cools $H_2$ with the cryogenic fluid provided from the cryogenic fluid tank;
an inlet line that sends the cryogenic fluid to the heat exchanger from the cryogenic fluid tank;
an outlet line that collects the cryogenic fluid from the heat exchanger;
an injection valve that is provided at the inlet line.

In first invention, the hydrogen refueling system may be operated in such a way that during part of the idle time of the system, the heat exchanger that cools $H_2$ with the cold and/or cryogenic fluid provided from the cryogenic fluid tank heats up more than 7° C. above its nominal temperature during FCV refueling, and that it is cooled down upon arrival of a vehicle to be refilled.

In first invention, the system further may include:
a vehicle detection system that detects that a vehicle to be refueled with $H_2$ is entering the HRS; and
a controller that controls the opening of the injection valve on a basis of a detection result of the vehicle detection system and on a basis of specific control strategy.

In first invention, the specific control strategy may include one or more control types, such as temperature control, pressure control, predetermined fixed opening values.

In first invention, the controller may control opening of the injection valve in such a way that during part of the idle time of the system, the heat exchanger that cools $H_2$ with the cold and/or cryogenic fluid provided from the cryogenic fluid tank heats up more than 7° C. above its nominal temperature during FCV refueling, and that it is cooled down upon arrival of a vehicle to be refilled.

In first invention, to control opening of the injection valve may include opening and closing the injection valve.

In first invention, the system further may include:
a temperature measuring unit that measures the temperature of the heat exchanger;
a valve control unit that makes an adjustment of the opening ratio of the injection valve so that the temperature measured by the temperature measuring unit is maintained within a predetermined temperature range or close to the target temperature.

In first invention, the controller may include the valve control unit.

In first invention, the system further may include:
a temperature comparison unit that determines whether the temperature of the heat exchanger measured by the temperature measuring unit is within a predetermined temperature range or close enough to the target temperature; and an output unit that outputs a ready-to-fill signal when the temperature comparison unit determined that the measured temperature is within the predetermined temperature range or close enough to the target temperature.

In first invention, the controller further may include a refueling control unit that controls $H_2$ refueling flow to vehicles; wherein, receiving ready-to-fill signal from the output unit, is one condition used by the refueling control unit to permit $H_2$ refueling flow to vehicles.

According to first invention, without maintaining the heat exchanger at cold temperature during HRS idle time, cooling of the heat exchanger is started when a vehicle entering the HRS is detected. By opening the injection valve that is located on the inlet line, cold and/or cryogenic fluid from the cryogenic fluid tank is fed into the heat exchanger, in order to cool it down. With this method, the only pieces of equipment that need to be cooled down to reach the condition to start refueling are the heat exchanger and the line from the cryogenic fluid tank to the heat exchanger. This can be done fast enough to have no or minimal waiting time of the customer before starting refueling. Upon starting refueling, $H_2$ is fed into the pre-cooled heat exchanger by opening $H_2$ supply valve, heat exchanger cold temperature is maintained by circulation of cold and/or cryogenic fluid. $H_2$ cooled to a predetermined temperature can be refueled to the vehicle.

In first invention, the controller may adjust opening of the injection valve in order to achieve fast cooling of the heat exchanger and temperature regulation once the target temperature is reached.

In first invention, the temperature measuring unit (or probe) may measure a temperature (t1) representative of the heat exchanger metal mass average temperature. The valve control unit can adjust of the opening ratio of the injection valve so that the temperature (t1) measured by the temperature measuring unit is maintained within a predetermined temperature range or close to the target temperature.

By adjusting the opening ratio of the injection valve, the heat exchanger is cooled quickly down to a predetermined target temperature and the temperature of $H_2$ during refueling can be kept within the desired temperature range after reaching the predetermined temperature range.

Depending on operating conditions, the valve control unit may use different control strategies, such as temperature control units, pressure controlling unit, level controlling units or predetermined fixed opening values.

Temperature controlling units may be for example using PID algorithm to adjust the injection valve opening ratio depending on measured temperature (e.g. t1).

In the first invention, the valve control unit may be used to control the temperature (t1) of the heat exchanger metal mass or to control the temperature of cryogenic fluid at outlet of the heat exchanger in the outlet line.

Pressure controlling units may be for example using PID algorithm to adjust the injection valve opening ratio depending on measured pressure.

Level controlling units may be for example using PID algorithm to adjust the valve injection valve opening ratio depending on measured level (e.g. cryogenic fluid level in cryogenic fluid tank).

For example, the valve control unit may use a first strategy to achieve fast cooling, upon detection of FCV entering the HRS and, after the measured temperature (t1) reaches the predetermined temperature range, may use a second strategy to maintain the heat exchanger temperature (t1) or the temperature (t2) of the cryogenic fluid at the outlet of the exchanger within a predetermined temperature range, then use a third strategy during $H_2$ refueling to FCV and finally use a fourth strategy after the end of refueling.

For example, in first invention, the injection valve control unit may use a fixed opening ratio upon detection of FCV entering the HRS, until the measured temperature (t1) reaches the predetermined temperature range and then may use temperature control unit to maintain measured temperature (t1) within the predetermined temperature range.

For example, in first invention, the valve control unit may close the injection valve after receiving the signal of end of refueling.

In first invention, the temperature measuring unit may be provided at a wall of the heat exchanger, at a channel of the inlet line or the outlet line within the heat exchanger or within the heat exchanger metal mass.

Alternatively, the temperature measuring unit may be provided at outlet of the heat exchanger in the outlet line, because the cryogenic fluid temperature at the outlet of the heat exchanger is representative of the average temperature of the metal mass of the heat exchanger, once it has been cooled down.

In first invention, the predetermined temperature range for the heat exchanger temperature (t1) or the temperature of cryogenic fluid at outlet of the heat exchanger may be for example −45° C. to −35° C., with a target temperature lying in between.

In first invention, the desired temperature range of $H_2$ at dispenser outlet during refueling may be for example −40° C. to −33° C.

In first invention, during $H_2$ refueling, the refueling control unit may control the opening ratio of a $H_2$ control valve on dispenser $H_2$ line that connects one high pressure $H_2$ source to the FCV tank, through the heat exchanger, the dispenser hose and the refueling nozzle. The refueling control unit may have interlocking logic and/or sequence logic with transition conditions.

In first invention, the output unit may send ready-to-fill signal to a refueling control unit. Upon receiving ready-to-fill signal from the output unit, the refueling control unit may permit opening of the $H_2$ control valve by releasing corresponding interlock and/or affecting the status of transition conditions of $H_2$ refueling sequence.

In first invention, the refueling control unit may display information about the status of heat exchanger temperature condition to start $H_2$ refueling to vehicle. When all conditions and/or interlocks prohibiting to start $H_2$ refueling to vehicle are released, the refueling control unit may send signal to display an information that $H_2$ refueling to vehicle can be started and/or to inform by audio device.

In first invention, upon refueling termination detected, the refueling control unit may send end of refueling signal to the controller or to the valve control unit.

In first invention, the controller may include a vehicle queuing calculation unit, that is using the signal(s) from vehicle detection system to calculate a signal indicating that no vehicle is waiting for refueling.

In first invention, the vehicle queuing calculation unit may further include a possibility of manual input by the operator that no vehicle is waiting for refueling.

In first invention, the vehicle queuing calculation unit may further use the end of refueling signal to calculate the signal indicating that no vehicle is waiting for refueling.

In first invention, the controller or the valve control unit may further control to close the injection valve after receiving the signal of end of refueling.

In first invention, the controller or the valve control unit may further control to close the injection valve only after receiving signal from the vehicle queuing calculation unit that no vehicle is waiting for refueling.

In first invention, the vehicle detection system consists for example of a camera with image treatment system, IR detector, pressure detector on the ground, magnetic loop in the ground or a combination of several detectors and/or techniques.

As second invention, a method for $H_2$ refueling to vehicles including: detecting that a vehicle to be refueled with $H_2$ is entering a hydrogen refueling station;

opening of an injection valve that is provided in an inlet line;

feeding cold and/or cryogenic fluid to a heat exchanger from a cryogenic fluid tank;

cooling down the heat exchanger by cold and/or cryogenic fluid; and refueling cold $H_2$ cooled down by the heat exchanger to the vehicle while maintaining a temperature of the heat exchanger within a predetermined temperature range or close to the target temperature.

In second invention, the method is operated in such a way that during part of the idle time, the heat exchanger that cools $H_2$ with the cold and/or cryogenic fluid provided from the cryogenic fluid tank heats up more than 7° C. above its nominal temperature during FCV refueling, and that it is cooled down upon arrival of a vehicle to be refilled.

In second invention, the method further may include: measuring a temperature (t1) of the heat exchanger;

determining whether the measured temperature (t1) within a predetermined temperature range or close enough to the target temperature;

outputting a ready-to-fill signal when determining that the measured temperature (t1) is within the predetermined temperature range or close enough to the target temperature; and releasing a corresponding interlock condition on $H_2$ control valve and/or affect the status of transition conditions of $H_2$ refueling sequence.

In first and second invention, "cryogenic fluid" may include for example liquid nitrogen, liquid carbon dioxide.

For a further understanding of the nature and objects for the present invention, reference should be made to the detailed description, taken in conjunction with the accompanying drawing, in which like elements are given the same or analogous reference numbers and wherein:

DETAILED DESCRIPTION OF THE PREFERRED EMBODIMENTS

Several embodiments of the present invention will be explained below. The embodiments explained below are to explain one example of the present invention. The present invention is not limited to the following embodiments at all and includes various types of modifications carried out within a scope where the gist of the present invention is not changed. All of the configurations explained below are not necessarily essential configurations of the present invention.

Embodiment 1

Figure 1:
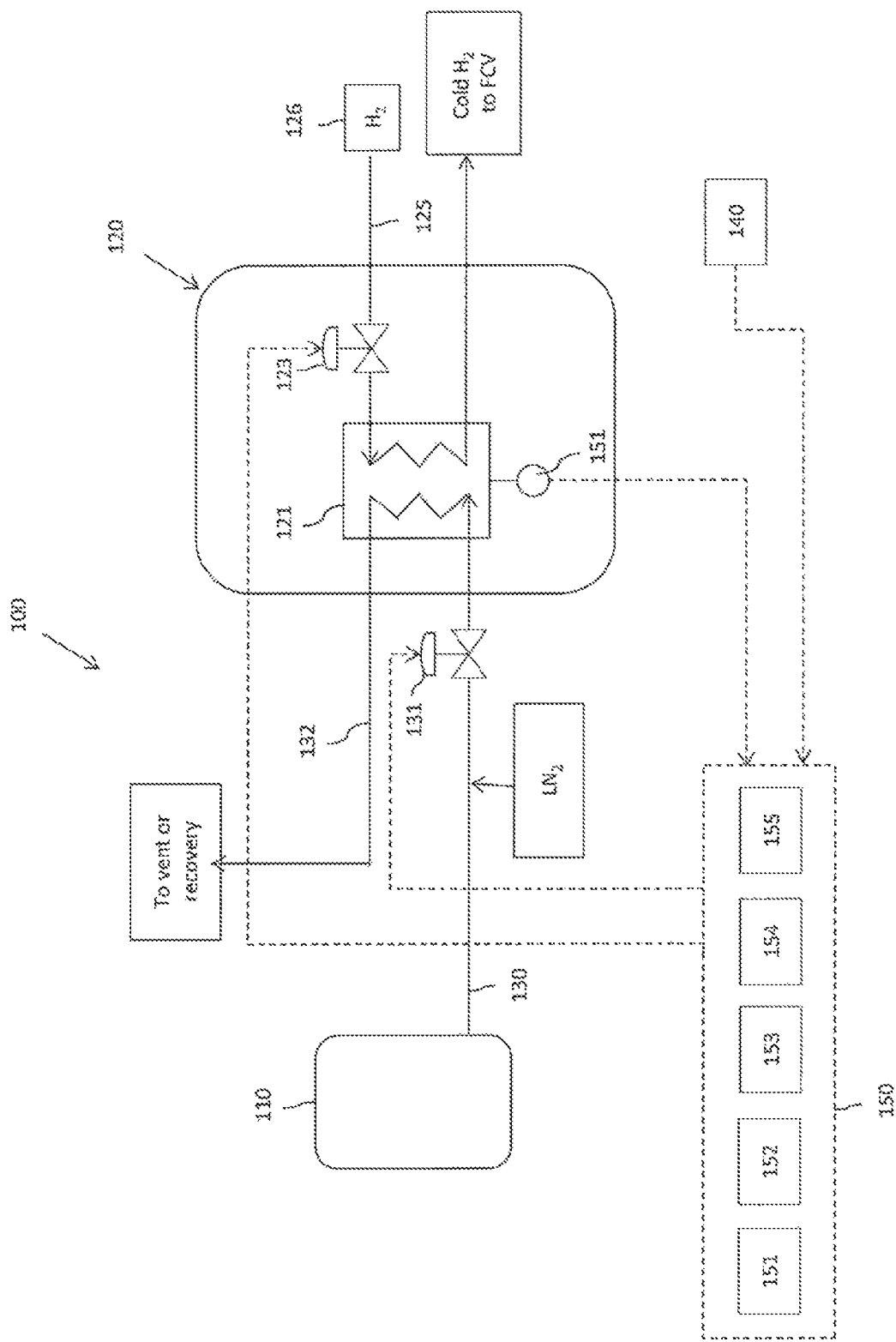
FIG. 1 illustrates an explanatory diagram showing a hydrogen refilling system according to Embodiment 1.
Figure 2:
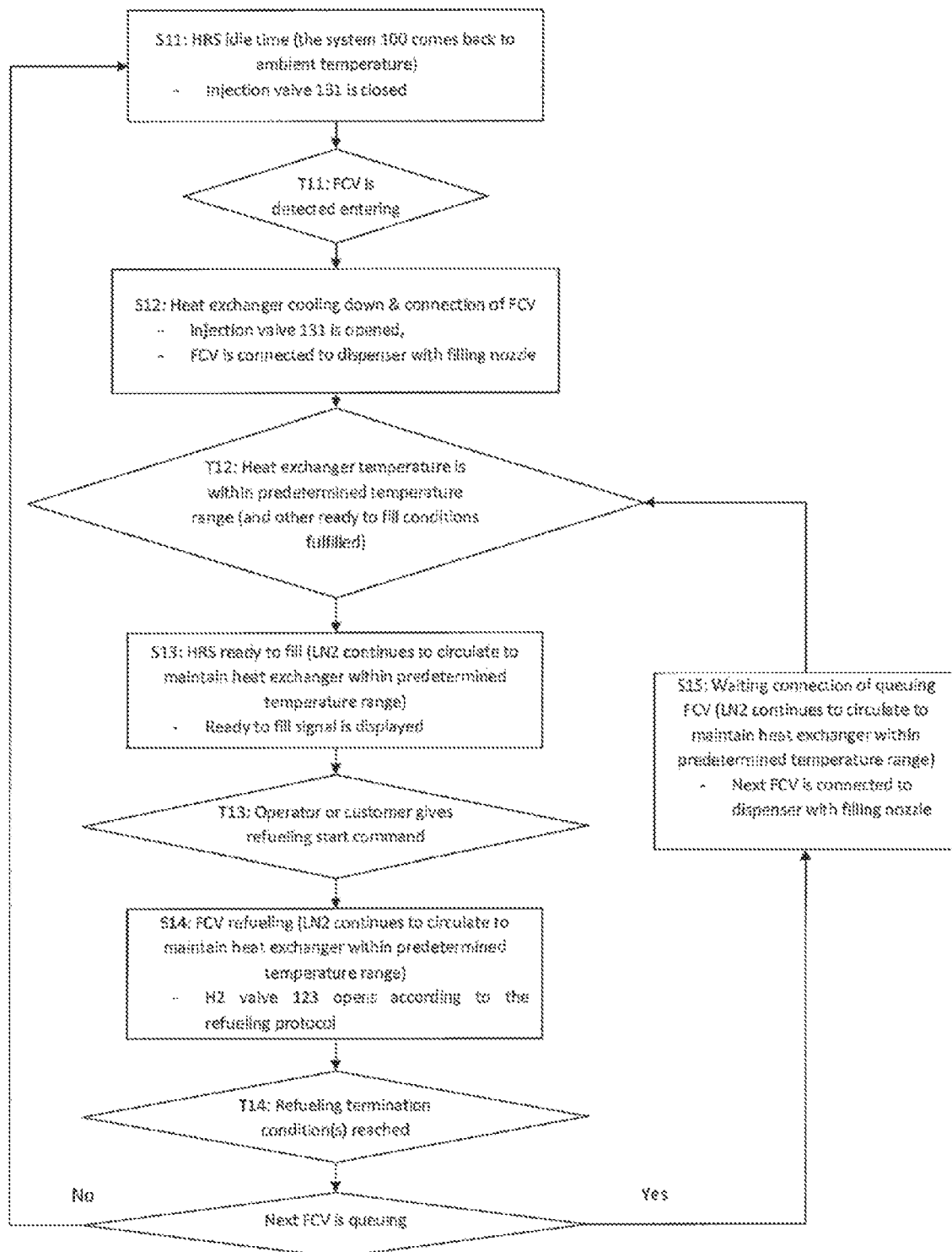
FIG. 2 illustrates an explanatory flowchart showing a hydrogen refilling system according to Embodiment 1.
Figure 3:
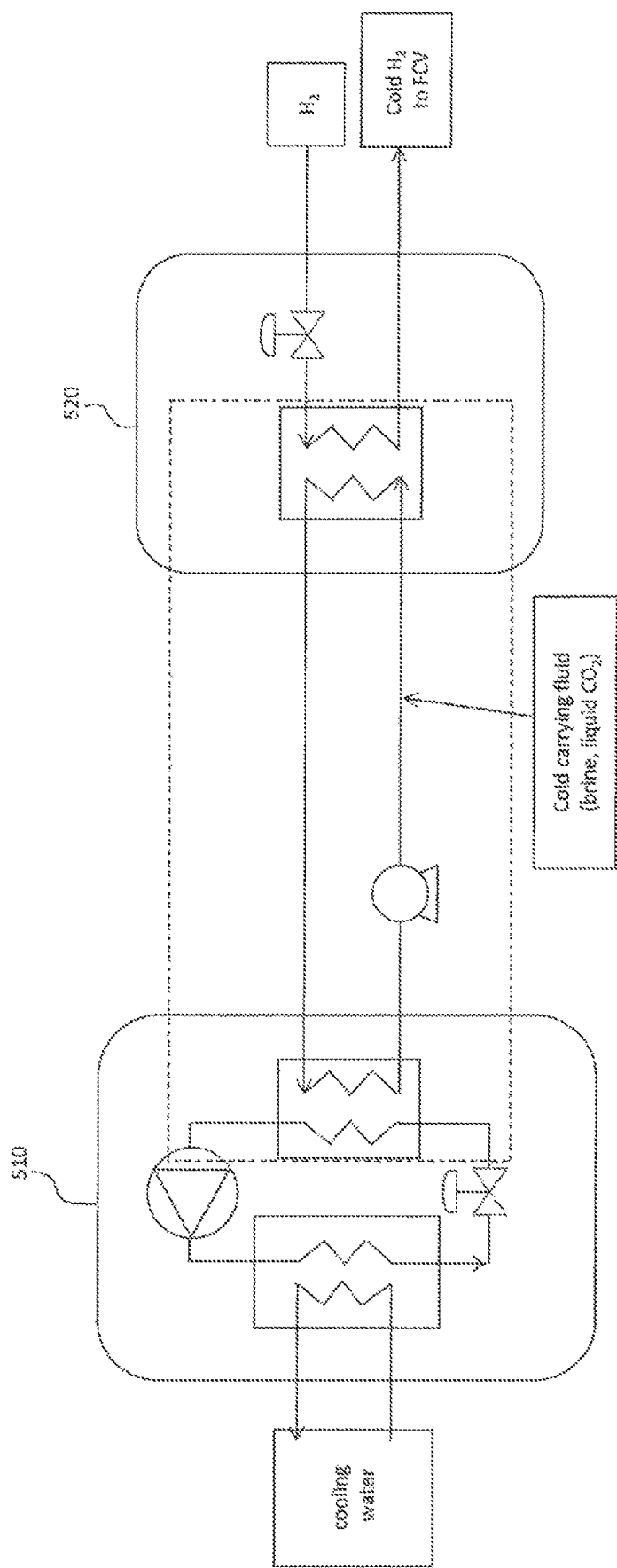
FIG. 3 illustrates an explanatory diagram showing prior art of a hydrogen refilling system.

The hydrogen refueling system 100 of the first embodiment is explained by referring FIGS. 1 and 2. The hydrogen refueling system 100 includes a liquid nitrogen ($LN_2$) tank 110 and Dispenser 120. $LN_2$ tank 110 stores the liquid nitrogen ($LN_2$).

First, Dispenser 120 is explained below.

Dispenser 120 supplies $H_2$ to a vehicle. Dispenser 120 includes the heat exchanger 121 that cools $H_2$ with $LN_2$ provided from the $LN_2$ tank 110. Dispenser 120 includes the dispenser hose and the refueling nozzle for refueling $H_2$ to a vehicle.

In this embodiment, the temperature control unit 151 measures the temperature (t1) of the heat exchanger metal mass. The temperature control unit 151 may measures the temperature at a wall of the heat exchanger 121, at a channel of the outlet line 132 within the heat exchanger 121. In this embodiment, the temperature control unit 151 includes both function of a temperature measuring unit and a valve control unit.

In other embodiment, the temperature control unit 151 may measures the temperature of $LN_2$ at outlet of the heat exchanger 121 in the outlet line 132.

In other embodiment, instead of the temperature control unit 151, the temperature measuring unit may measures the temperature (t1) of the heat exchanger 121. The temperature measuring unit may be provided at a wall of the heat exchanger 121, at a channel of the outlet line 132 within the heat exchanger 121 or within the heat exchanger metal mass.

The inlet line 130 is a line for sending $LN_2$ to the heat exchanger 121 from $LN_2$ tank 110. The outlet line 132 is a line for collecting $LN_2$ from the heat exchanger 121. The inlet line 130 or the outlet line 132 is configured may be usual pipe or an insulated pipe.

The injection valve 131 is provided at an inlet side of the heat exchanger 121 at the inlet line 130 but the injection valve 131 may be located at any point of the inlet line 130.

The vehicle detection system 140 detects that a vehicle to be refueled with $H_2$ is entering the HRS(Hydrogen Refueling Station). The vehicle detection system 140 is for example of a camera with image treatment system, IR detector, pressure detector on the ground, magnetic loop in the ground or a combination of several detectors and/or techniques.

Next, the controller 150 is explained below. The controller 50 may be configured by combination between hardware and software program, firmware, dedicated circuit or combination of thereof, the controller 150 includes one or more function unit (it is so called function module).

The controller 150 controls opening the injection valve 131 on the basis of a detection result of the vehicle detection system 140 and on the basis of specific control strategy. More specifically, the controller 150 is constituted by the following elements.

The temperature control unit 151 can adjust the opening ratio of the injection valve 131 depending on measured temperature (t1) so that the temperature (151) measured by the temperature control unit 151 is maintained within a predetermined temperature range (or close to the target temperature). By adjusting the opening ratio of the injection valve 131, the heat exchanger 121 is cooled quickly down to a predetermined target temperature and the temperature of $H_2$ during refueling can be kept within the desired temperature range after reaching the predetermined temperature range.

The temperature comparison unit 152 determines whether the temperature (t1) measured by the temperature control unit 151 is maintained within the predetermined temperature range (or close enough to the target temperature).

The output unit 153 outputs a ready-to-fill signal when the temperature comparison unit 152 determined that the measured temperature (t1) is within the predetermined temperature range (or close enough to the target temperature).

In this embodiment, the predetermined temperature range for the heat exchanger temperature (t1) may be for example −45° C. to −35° C., with a target temperature lying in between.

The desired temperature range of $H_2$ at dispenser outlet during refueling may be for example −40° C. to −33° C.

The output unit 153 sends releasing ready-to-fill signal to a refueling control unit 154.

The refueling control unit 154 controls $H_2$ refueling flow to vehicles by Dispenser 120. During $H_2$ refueling, the refueling control unit 154 controls the opening ratio of a $H_2$ control valve 123 on a dispenser $H_2$ line 125 that connects one high pressure $H_2$ source 126, so as to feed $H_2$ into the heat exchanger 121 from $H_2$ source 126.

The refueling control unit 154 has interlocking logic and/or sequence logic with transition conditions. Typically, $H_2$ control valve 123 cannot be opened or is closed by the function of the interlocking logic and/or sequence logic. $H_2$ can be refueled by releasing relevant interlocks and/or affecting $H_2$ refueling sequence transition conditions.

In this embodiment, after receiving the ready-to-fill signal from the output unit 153, the refueling control unit 154 releases the corresponding interlock condition on $H_2$ control valve 123 and/or affect the status of transition conditions of $H_2$ refueling sequence. Subsequently, when all other conditions and/or interlocks prohibiting to start $H_2$ refueling to vehicle are released, and upon manual command by operator or customer, the refueling control unit starts refueling and opens the $H_2$ control valve 123.

The refueling control unit 154 displays information about the status of heat exchanger temperature condition to start $H_2$ refueling to vehicle. When all conditions and/or interlocks prohibiting to start $H_2$ refueling to vehicle are released, the refueling control unit 154 send signal to display an information that $H_2$ refueling to vehicle can be started and/or to inform by audio device.

The refueling control unit 154 sends a signal of end of refueling. The signal of end of refueling is for example a signal for indicating (informing) that filling termination conditions have been reached and that $H_2$ control valve 123 has been closed.

In this embodiment, the vehicle queuing calculation unit 155 calculates a signal indicating that no vehicle is waiting for refueling by using the detection signal(s) from the vehicle detection system 140. The vehicle queuing calculation unit 155 may include a possibility of manual input by the operator that no vehicle is waiting for refueling. The vehicle queuing calculation unit 155 may use the end of refueling signal to calculate the signal indicating that no vehicle is waiting for refueling. In this embodiment, the temperature control unit 151 may control to close the injection valve 131 only after receiving signal from the vehicle queuing calculation unit 155 that no vehicle is waiting for refueling.

Next flowchart of FIG. 2 is explained below.

In the HRS idle time, the injection valve 131 is closed, the system 100 come back to ambient temperature (step S11).

As another embodiment instead that the system 100 comes back to ambient temperature, the controller 150 may control opening of the injection valve 131 in such a way that during part of the idle time of the system 100, the heat exchanger 121 that cools $H_2$ with $LN_2$ provided from the tank 110 heats up more than 7° C. above its nominal temperature during FCV refueling, and that it is cooled down upon arrival of a vehicle to be refilled.

The vehicle detection system 140 detects that a vehicle to be refueled with $H_2$ is entering the HRS (transition T11).

The controller 150 controls opening of the injection valve 131 and cold and/or liquid nitrogen is fed into the heat exchanger 121 through the inlet line 130 from the tank 110 (step S12). The temperature within the heat exchanger 121 cools down rapidly. $LN_2$ which is possibly mixture in liquid and/or gaseous phase is sent to the vent or the recycling process through the outlet line 132 from the heat exchanger 121.

The temperature control unit 151 controls the injection valve 131 on a fixed high opening ratio upon detection of FCV entering the HRS, thus providing high cooling power.

The temperature of heat exchanger 121 is measured by the temperature control unit 151. The temperature comparison unit 152 determines whether the temperature (t1) measured by the temperature control unit 151 is maintained within the predetermined temperature range or close enough to the target temperature.

In the meantime the vehicle to be refueled is positioned in front of the dispenser. Then, operator or customer connects the FCV receptacle to the dispenser using dispenser hose and nozzle.

The output unit 153 outputs a ready-to-fill signal when the temperature comparison unit 152 determined that the measured temperature (t1) is within the predetermined temperature range or close enough to the target temperature. After receiving the ready-to-fill signal from the output unit 153, the refueling control unit 154 releases the corresponding interlock condition on $H_2$ control valve 123 and/or affect the status of transition conditions of $H_2$ refueling sequence.

After receiving the ready-to-fill signal from the output unit 153, the temperature control unit 151 changes strategy to adjust opening ratio of the injection valve 131, depending on the heat exchanger measured temperature (t1), so that it is within the predetermined temperature range or close enough to the target temperature.

Subsequently, when other ready-to-fill conditions are fulfilled (e.g. detection that dispenser nozzle has been connected to FCV receptacle), the system is goes to step S13 (transition T12).

HRS is in ready-to-fill status and cold/liquid nitrogen continues to circulate, in order to maintain the heat exchanger within a predetermined temperature range or close to the target temperature (step S13). The temperature control unit 151 continues to use the same strategy to maintain the heat exchanger temperature (t1) within a predetermined temperature range.

The refueling control unit 154 displays information about the status of heat exchanger temperature condition to start $H_2$ refueling to vehicle. The refueling control unit 154 send signal to display an information that $H_2$ refueling to vehicle can be started and/or to inform by audio device.

The operator or customer gives start command of $H_2$ refueling to the vehicle (transition T13).

Following filling protocol, the refueling control unit 154 controls $H_2$ control valve 123, in order to transfer hydrogen from the hydrogen high pressure source 126 to the tank of FCV; and cold/liquid nitrogen continues to circulate, in order to maintain the heat exchanger within a predetermined temperature range or close to the target temperature (step S14). The temperature control unit 151 continues to use the same strategy to maintain the heat exchanger temperature (t1) within a predetermined temperature range.

The refueling control unit 154 sends a signal of end of refueling indicating (informing) that filling termination conditions have been reached and that $H_2$ control valve 123 has been closed (transition T14).

If the vehicle queuing calculation unit 155 sends signal that no other vehicle is waiting for refueling, the system goes to step S11, which is already described above.

If the vehicle queuing calculation unit 155 sends signal that another vehicle is waiting for refueling, the system goes to step S15, which is described below.

The next vehicle to be refueled is positioned in front of the dispenser. Then, operator or customer connects the FCV receptacle to the dispenser using dispenser hose and nozzle (step S15). The temperature control unit 151 continues to use the same strategy to maintain the heat exchanger temperature (t1) within a predetermined temperature range.

Subsequently, when other ready-to-fill conditions are fulfilled (e.g. detection that dispenser nozzle has been connected to FCV receptacle), the system goes to step S13, which is already described above (transition T12).

Example 1

Currently, the weight of compact stainless steel diffusion bonded heat exchangers used in $H_2$ dispensers can be around 150 kg. Around 5000 kJ are necessary to cool down the mass of the heat exchanger from 30° C. to −40° C.

This could be achieved within 3 minutes with around 30 kW frigorific power. Such power is achievable by injection of ~500 l/h of liquid nitrogen.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for $H_2$ refueling to vehicles comprising:
   (a) providing a hydrogen refueling system that comprises a cryogenic fluid tank that stores a cryogenic fluid, a dispenser that supplies $H_2$ to a vehicle, a heat exchanger that cools $H_2$ with the cryogenic fluid provided from the cryogenic fluid tank, an inlet line that sends the cryogenic fluid to the heat exchanger from the cryogenic fluid tank, an outlet line that collects the cryogenic fluid fed from the heat exchanger, and an injection valve that is provided in the inlet line;
   (b) detecting that a first vehicle to be refueled with $H_2$ is entering said hydrogen refueling station;
   (c) opening said injection valve;
   (d) feeding the cryogenic fluid to said heat exchanger from said cryogenic fluid tank;
   (e) controlling a temperature of the heat exchanger to ensure the heat exchanger temperature is within a predetermined temperature range with the cryogenic fluid, a nominal operating temperature of the heat exchanger being within the predetermined temperature range;
   (f) refueling cold $H_2$ cooled down by the heat exchanger to the first vehicle while maintaining the temperature of the heat exchanger within the predetermined temperature range;
   (g) after completion of said refueling, allowing the first vehicle to leave the hydrogen refueling station;
   (h) detecting that no vehicle to be refueled with $H_2$ is entering the hydrogen refueling station and closing the injection valve based upon said lack of detection;
   (i) allowing the heat exchanger temperature to rise at least 7° C. above the nominal operating temperature; and
   (j) after said rise in temperature of heat exchanger to at least 7° C. above the nominal operating temperature, detecting that a second vehicle to be refueled with $H_2$ is entering the hydrogen refueling station and performing the following steps, in order: said injection valve is opened, the cryogenic fluid is fed to said heat exchanger from said cryogenic fluid tank, the heat exchanger temperature of is controlled to ensure the heat exchanger temperature is within the predetermined temperature range with the fed cryogenic fluid, and the second vehicle is refueled with cold $H_2$ cooled down by the heat exchanger while the temperature of the heat exchanger is maintained within the predetermined temperature range.

2. The method of claim 1, further comprising:
   measuring a temperature (t1) of the heat exchanger;
   outputting a ready-to-fill signal from a controller when said controller determines that the measured temperature (t1) is within the predetermined temperature range; and
   releasing a corresponding interlock condition on a $H_2$ control valve and allowing performance of said step (e).

3. The method of claim 1, wherein said step of detecting that a vehicle to be refueled with $H_2$ is entering a hydrogen refueling station and said step of detecting that no vehicle to be refueled with $H_2$ is entering a hydrogen refueling station are performed using a vehicle detection system that detects whether a vehicle to be refueled with $H_2$ is entering a hydrogen refueling station (HRS).

4. The method of claim 1, wherein said controller controls a flow of $H_2$ to the vehicle during step (f).

* * * * *